Figure 1:
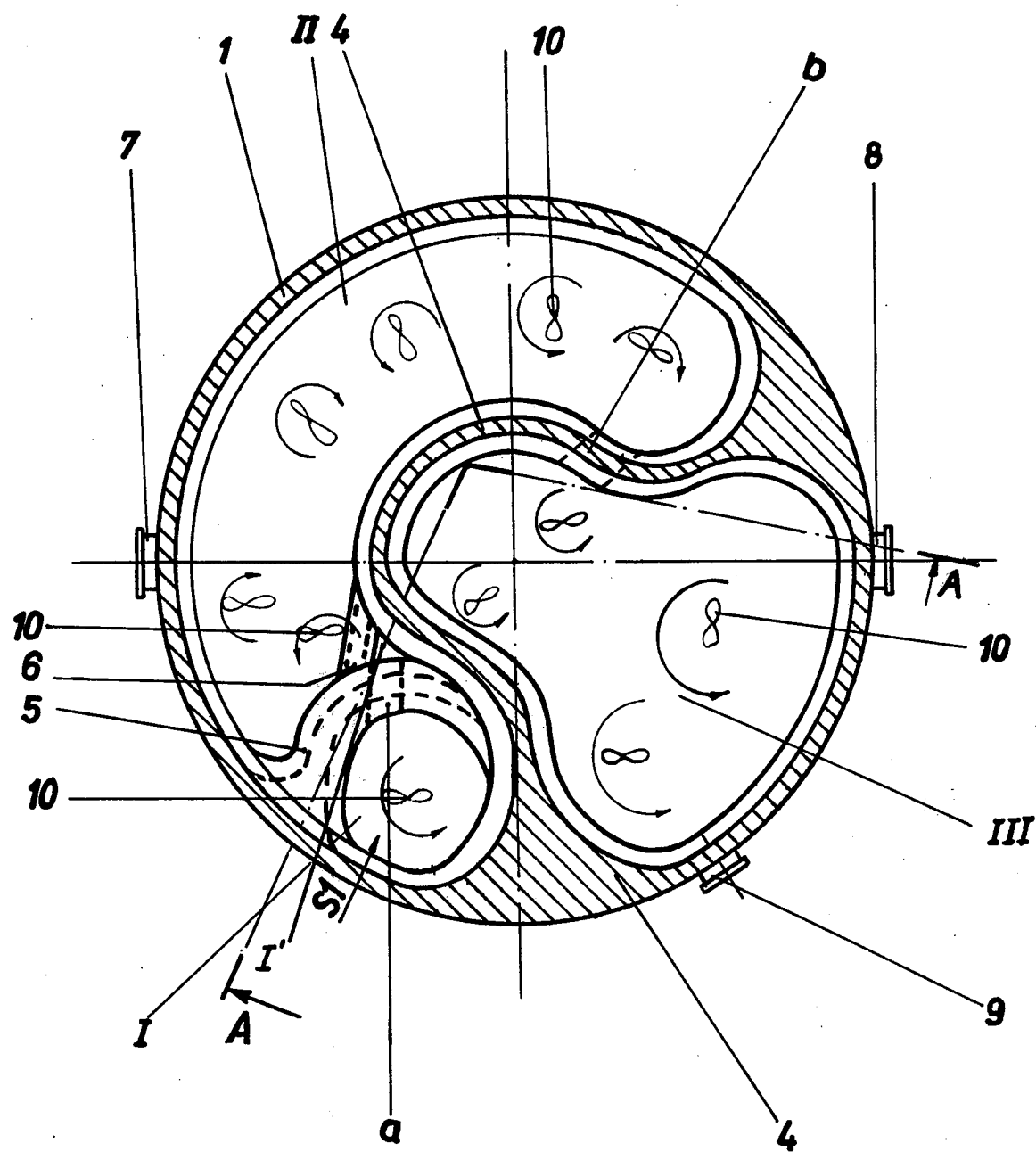

United States Patent [19]

Popovici

[11] 4,205,046

[45] May 27, 1980

[54] REACTOR FOR PHOSPHORIC ACID PRODUCTION

[75] Inventor: Neculai Popovici, Bucharest, Romania

[73] Assignee: Institutul de Inginerie Tehnologica Si Proiectare Pentru Industria Chimica, Bucharest, Romania

[21] Appl. No.: 940,147

[22] Filed: Sep. 6, 1978

[30] Foreign Application Priority Data

Jan. 18, 1978 [RO] Romania .................................. 92938

[51] Int. Cl.² ............................ F01C 1/08; F01C 1/00
[52] U.S. Cl. ..................................... 422/193; 422/228; 422/225
[58] Field of Search ............... 422/245, 224, 188, 189, 422/193, 194, 234, 224, 225, 228, 236; 423/319, 320

[56] References Cited

U.S. PATENT DOCUMENTS

| | | | |
|---|---|---|---|
| 3,023,089 | 2/1962 | Graves et al. | 422/193 |
| 3,181,931 | 5/1965 | Weber | 422/193 |
| 3,415,629 | 12/1968 | Pelitti | 422/228 |
| 3,803,293 | 4/1974 | Randolph et al. | 423/320 |

FOREIGN PATENT DOCUMENTS 640909 12/1963 Belgium .................................. 422/236

*Primary Examiner*—Joseph Scovronek
*Assistant Examiner*—Chris Konkol

[57] ABSTRACT

There is disclosed a reactor designed to produce phosphoric acid by wet process. The reaction vessel proper is a cylindrical body divided into two compartments by a sinusoidal wall. The first space formed inside by the cylindrical wall of the vessel and the sinusoidal one and by one curved segment joining them is semi-circular and serves as pre-mixer provided with a stirring device and a pocket to allow the fluid flowing down through the bottom to reach the reaction space overhead. The reaction vat has two compartments and provided with a series of stirring devices so located as to permit an efficient, intimate mixture of the reaction medium. The vat is integrally roofed by a tight cover with many orifices left in it fitted for connection sleeves, such as: supply, gas venting, sight holes, and manholes, etc. The reactor incorporates as an integral unit a space devoted to the pre-mixing of reactants and means to guide the reaction medium through the reaction vessel; in this way the retention time required for the reaction process and calcium sulphate crystallization is decreased.

1 Claim, 2 Drawing Figures

REACTOR FOR PHOSPHORIC ACID PRODUCTION

This invention relates to an apparatus for the production of phosphoric acid by the wet process, the method carried out thereby based on the attack of natural phosphate with sulphuric acid, from which calcium sulphate is obtained as a by-product.

The attack of phosphate rock with sulphuric acid is a process that requires a large volume for the reaction taking place at a reduced rate.

At present there are known several procedures for the continuous production by the wet process of phosphoric acid, either by means of a series of cascade-mounted reactors, or by a single but large-sized reactor with or without compartments, normally preceded by a pre-mixer for the reaction ingredients. Cascade reactors are functionally and constructionally different.

The first vessel with a reduced capacity (the pre-mixer) serves to prepare the mixture of recirculated slurry and phosphate. The next larger vessels or vats are so arranged as to achieve the reaction between the mixture of sulphuric acid and low concentration phosphoric acid from the filters with phosphate slurry from the pre-mixer. The number and capacity of these reaction vessels are so chosen as to allow the utmost disintegration of the phosphate rock material. After the slurry has passed through the series of reactors, it is partially recirculated to the pre-mixer and partially sent to a final buffer tank used for filtration.

The cascade-type reactors permit the interphase process to be controlled. Their disadvantage derives from the required surface area with consequently reduced productivity streams when abundantly foaming phosphates are reacted.

The adoption of a simplified installation constituted of a single reaction vessel is also a known practice, but this type of apparatus requires an increased (by about 20%) useful capacity compared with that of cascade reactors and, besides, it fails to insure that the process is correctly carried out because the process interphases cannot be controlled.

There are also known attempts to improve the single reactor by way of compartments which makes possible interphase control, but without eliminating the possibility of various troubles, as can be seen from the following:

if one of the partition walls fails, one or more compartments can fail by short-circuiting and the slurry may reach the discharge hole before the completion of the reaction;

if one of the compartments fails, its isolation for repair is not possible, so that it is necessary to disconnect the whole reactor;

because the reaction compartments are not of a cylindrical shape, the formation of stagnant zones with deposits is likely to cause a decrease in useful volume of the reactor.

Another known reactor design has a polygonal shape conceived as a single reaction unit, with from six to ten walls, of which two opposite walls are longer. Centrally, on the longitudinal axis, there is located a vertical baffle with one end fastened to one of the reactor walls. The reagents are introduced through one face of the central wall and are discharged through the opposite side. The port pierced in the baffle allows the slurry to recirculate easily. This type of reactor can not, however, eliminate the faults apparent in the single vessel with compartments. Moreover, its construction is difficult, and it has a poor mechanical stability.

A single reaction vessel is also known of the type with controllable reaction medium and a separate pre-mixer, by which only some of the drawbacks evidenced by the earlier single reactors are eliminated; thus, a few deficiencies are still maintained:

in the first place, the fact of using a separate pre-mixer for the reaction media before entering the reactor proper, in the event of dealing with phosphates evolving an abundant foam during the reaction process, brings about a substantial reduction in the production capacity associated with foam entrainments into the gas suction system; this leads to considerable losses of useful substances and to an increased rate of pollutants in the chemical impure process waters;

the design with a separate pre-mixer is more costly since it requires more space and more height for the arrangement of the raw material supply system;

the reaction medium guiding wall, being limited to the length of the single vessel, has but a partial influence in the determination of the longest path of travel of the reaction mixture; hence this reactor involves the excessive utilization of the useful capacity of the reactor.

The reactor according to the invention overcomes the drawbacks mentioned above; in a preferred embodiment thereof the reactor has a cylindrical tank whose circular lateral wall, together with a sinusoidal vertical wall, a circular vertical wall and a vertical one form together a closed space inside the reactor divided into compartments: one of the compartments is for the pre-mixing of reagents, one is an overflowing compartment, one is the compartment in which the natural phosphate decomposition is taken to completion, and the last compartment allows calcium sulphate crystallization; the pre-mixing and overflowing compartments are connected through a port situated at the bottom of the circular vertical wall, and the other two compartments are in communication through a hole made in the sinusoidal vertical wall lower part. These compartments achieve both the pre-mixing of the reagents and the reaction proper, while the sinusoidal wall makes possible (due to its peculiar form) the circulation of the mixed reagents which are guided within a time interval at a speed of movement in accordance with the process requirements and the reaction stages: pre-mixing, decomposition, crystals formation and crystals growth.

IN THE ACCOMPANYING DRAWING

Figure 2:
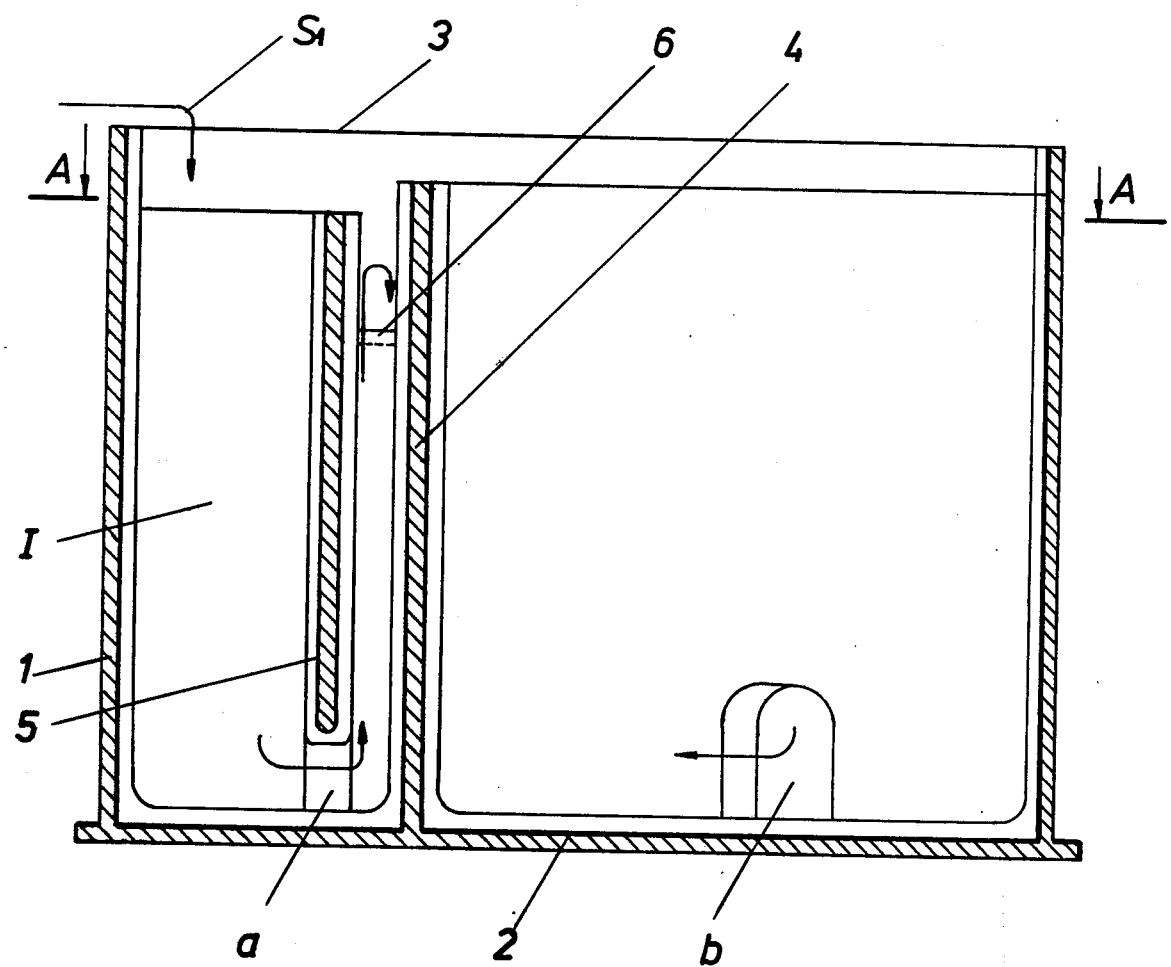

FIG. 1 is a section along a horizontal plane of a single reactor with an immersed pre-mixer and controllable reaction medium; and FIG. 2 is a view in cross section taken along the line A—A of FIG. 1 of the single reactor with immersed pre-mixer of that figure.

The reactor according to the illustrative embodiment of the invention is circular cylindrical in shape and has a circular lateral wall 1, a bottom 2 and a cover 3.

Inside the reactor there are provided a sinusoidal vertical wall 4 and a pre-mixer made up of a semi-cylindrical compartment I, separated from the lateral wall 1 and the vertical wall 4 by a vertical circular wall connecting segment 5 shorter than the walls 1 and 4 but taller than the level of the liquid in the reactor.

There is also provided, between the wall 5, of the pre-mixer I, and the wall 4 another vertical wall 6 shorter than the wall 5, a compartment I' which determines the liquid level in the pre-mixer I by an opening a situated at the bottom of wall 5 allowing the reaction medium discharge through the lower part of pre-mixer I and its overflowing on the top of compartment I' into another compartment II isolated by the walls 1, 4, 5 and 6.

The walls 1 and 4 also serve to delimit inside the reactor a further compartment III in communication with the compartment II through a hole b provided in the bottom of wall 4, situated in a zone relatively opposite to the position of pre-mixer I.

The lateral wall 1 of the reactor is provided with a manhole 7 and two sleeves 8 and 9 to fit to the recirculating pump not being figured that also performs the unit discharge out.

Inside the pre-mixer I and the compartments II and III, there are located several mixing devices 10, whose shape, size and number are determined by the reactor position and dimensions, and which take part in the homogenization process of the reaction components and in the governing of flow direction of the same.

In cover 3 there are provided a number of holes for the mixing devices (not shown), the pumps (not shown), the raw material supply, the gas venting and for other purposes.

The reactor has both the bottom 2 and the walls 1, 4, 5 and 6 either built in concrete or in protected metal. All the reactor surfaces coming in contact with the phosphoric acid are covered with rubber foil, antiacid brick or graphite brick.

The reactor operation takes place as described below:

The feed constituted of ground phosphate rock and recirculated slurry is introduced into the reactor by the supply hole in cover 3 marked $S_1$. Upon completion of homogenization in pre-mixer I, the resulting slurry leaves the unit through the bottom hole a and after passing through compartment I' and travels by overflowing into compartment II of the reactor. Into the reactor there is introduced through several holes the mixture of sulphuric acid and recirculated phosphoric acid, the completion of reaction of natural phosphate being enhanced by an intimate mixing of the components by means of the agitators 10 distributed throughout the reaction zone. The acid quantity is adjusted in dependence on the $SO_4^{-2}$ ions contained in the slurry to assure a high rate of decomposition. The reaction being exothermic, the optimum temperature is maintained by cold air blown by a fan and a distributor (not shown) provided for the whole zone, or by the recirculation of reaction slurry to a vacuum cooling installation (not shown).

Due to the direction of rotation, the construction of agitators 10 and the form of the guiding wall 4, the reaction mixture goes through the compartment II and travels into the compartment III through the hole b, where the process of crystallization of calcium sulphate is taken to completion.

The cooling air and/or the reaction gases evolved are guided to a gas scrubber (not shown). The slurry build up in front of the suction sleeve 8 is partially sucked by a recirculating pump (not shown) and sent to join the reaction stream.

The reactor designed for phosphoric acid manufacture according to the invention is advantageous for the following reasons:

- it permits the control and correction of the mixed reagents as the reaction develops in the different zones of the reactor;
- it permits a higher recovery rate of $P_2O_5$ from the natural phosphate;
- is of a simple, rugged and safe constructional design which occupies but a reduced space and is easily operated;
- it requires lower investment costs;
- is readily adaptable to any other variable of wet process applications for the production of phosphoric acid from phosphates and sulphuric acid;
- it permits the processing of phosphates so as to bring about a foaming phenomenon during the reaction progress with no need to reduce the production capacity;
- it presents a high efficiency coefficient expressed in tons of $P_2O_5$ day/$m^3$ of the useful volume of the vat;
- it combines profitably the features of the cascade reactors with those of a single reactor.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. A reactor for the manufacture of phosphoric acid by the wet process starting with natural phosphate and sulphuric acid, comprising a circular cylindrical tank of which a lateral circular wall together with a sinusoidal vertical wall, a circular vertical wall and another vertical wall delimit inside the reactor a first compartment for the pre-mixing of reactants, a second overflowing compartment, a third compartment for the completion of the natural phosphate decomposition, and a fourth, final compartment in which the crystallization process of calcium sulphate is taken to completion, the first, pre-mixing compartment and the second, overflowing compartment communicating with each other by means defining a hole situated in the circular vertical wall bottom side, the third and fourth compartments communicating through means defining a hole in the sinusoidal vertical lower side, all the compartments providing both the pre-mixing of reactives and the reaction proper, the sinusoidal wall promoting simply by its configuration the guiding of the stream of reagents whose forward movement is adjusted according to the requirements of each phase of the reaction process: pre-mixing, decomposition, crystal formation and crystal growth.

* * * * *